United States Patent [19]
Mimachi

[11] Patent Number: 5,923,529
[45] Date of Patent: Jul. 13, 1999

[54] CARD SLOT UNIT FOR A PERSONAL COMPUTER

[75] Inventor: Motomu Mimachi, Kanagawa, Japan

[73] Assignee: Sony Corporation, Tokyo, Japan

[21] Appl. No.: 08/842,576

[22] Filed: Apr. 15, 1997

Related U.S. Application Data

[30] Foreign Application Priority Data

Apr. 25, 1996 [JP] Japan .................................. P08-104980

[51] Int. Cl.⁶ .............................. G06F 1/16; H05K 7/02; H01R 9/09
[52] U.S. Cl. .............................. 361/684; 361/785; 439/65
[58] Field of Search ..................................... 361/684, 733, 361/737, 785, 790, 791–803; 439/65, 620; 364/708.1; G06F 1/16

[56] References Cited

U.S. PATENT DOCUMENTS

| | | | |
|---|---|---|---|
| 5,198,964 | 3/1993 | Ito et al. ................................... | 361/717 |
| 5,248,853 | 9/1993 | Ishikawa et al. ........................ | 174/256 |
| 5,305,182 | 4/1994 | Chen ........................................ | 361/684 |
| 5,408,386 | 4/1995 | Ringer et al. ............................ | 361/785 |
| 5,428,535 | 6/1995 | Katsumata et al. ..................... | 361/785 |
| 5,454,725 | 10/1995 | Speiser et al. ............................ | 439/61 |
| 5,502,617 | 3/1996 | Katsumi et al. . | |
| 5,571,996 | 11/1996 | Swamy et al. .......................... | 361/791 |
| 5,576,935 | 11/1996 | Freer et al. .............................. | 361/785 |
| 5,761,052 | 6/1998 | Wheeler-King et al. ............... | 361/803 |

FOREIGN PATENT DOCUMENTS

| | | |
|---|---|---|
| 04288000 | 10/1992 | European Pat. Off. . |
| 571 138 | 11/1993 | European Pat. Off. . |
| 589 743 | 3/1994 | European Pat. Off. . |

OTHER PUBLICATIONS

Legg "Special components simplify interface to PCMCIA cards" *Electrical Design News,* 38: Jun. 10, No. 12 (1993).

*Primary Examiner*—Lynn D. Feild
*Attorney, Agent, or Firm*—Ronald P. Kananen; Rader, Fishman & Grauer

[57] ABSTRACT

The present invention provides a card slot unit that allows a function extending card having connection electrodes on an insertion-edge side to be inserted into the card slot unit for establishing electrical connection with the card slot unit. The unit comprises

- a slot board on which a predetermined wiring pattern is formed;
- a slot connector which is mounted on the slot board and has connector pins electrically as well as mechanically connectable to the connection electrodes of the function extending card;
- a card control IC which is mounted on the slot board and electrically connected to the connector pins of the slot connector through the wiring pattern; and
- an output connector which is mounted on the slot board and electrically connected to the card control IC through the wiring pattern.

The card slot unit is hardly affected by noise, reducing the number of errors generated in the signal. As a result, the operating frequency can be raised.

12 Claims, 7 Drawing Sheets

CARD SLOT UNIT FOR A PERSONAL COMPUTER

BACKGROUND OF THE INVENTION

1. Field of the Invention

The present invention relates to a card slot unit, its manufacturing method and a computer apparatus.

2. Description of the Related Art

In general, in a personal computer, also referred to hereafter simply as a PC, particularly in a portable PC such as a notebook PC and a small-size information apparatus, there is provided a card slot unit for mounting cards in most of the equipment so that a function extending card can be utilized for realizing the functional extendibility of the equipment. In recent years, such a card slot unit is becoming indispensable with the popularization of the PC. Function extending cards are not limited to that having simply an added value of a memory card. Function extending cards offering added values offered by cards such as a facsimile-modem card, an SCSI (Small Computer System Interface) card, a hard-disk interface card, a LAN (Local Area Network) adapter card, a tuner-adapter card and a camera-adapter card become available, widening the range of applications of the card slot unit.

FIG. 1 is a block diagram showing a typical configuration of a PC having a card slot unit of the type described above.

As shown in the figure, a card slot unit 2 is built inside the main body 1 of a PC. A function extending card 3 such as a PC card can be plugged into the card slot unit 2. In general, the configuration of the card slot unit 2 comprises a slot board 4 serving as a base and a slot connector 5 mounted on the slot board 4 as shown in FIG. 2. The slot connector 5 is a part serving as contact with the function extending card 3. Signals from the function extending card 3 are supplied to a card control device 6 shown in FIG. 1 through a wiring pattern of the slot board 4 which is not shown in the figure. The card control device 6 is mounted on a main board, which is also not shown in the figure, along with a CPU chip (a microprocessor) 7, a memory/bus controller 8 and a main-storage chip 9. A system bus 10 connected to the CPU chip 7 is created on the main board. The card control device 6 and the memory/bus controller 8 are also connected to the system bus 10.

In a PC system having the configuration described above, the function extending card 3 is plugged into the card slot unit 2, providing an additional function to the main body 1 of the PC. In this arrangement, signals are exchanged between the function extending card 3 and the main body 1 of the PC by way of signal wires extended through the card slot unit 2 and the card control device 6.

In the above embodiment, by the way, all controllers are traditionally mounted on the main board of the PC main body 1 on which the system bus is created. In addition, in order to make the assembly work convenient, IC chips and other parts are all mounted on the main board. Because of these reasons, the card control device 6 is mounted at a location in close proximity to the system bus 10. In such an arrangement, however, wiring on the card slot unit 2, wiring on the main board and a means for connecting them to each other are required. As a result, a wiring path from the function extending card 3 plugged in the card slot unit 2 to the card control device 6 on the main board becomes long and the inductance (L) as well as the capacitance (C) of signal lines between them also increase as well. In such a structure, when a signal with a high frequency such as a moving-picture signal 1 is input through the function extending card 3, in particular, the waveform of the signal becomes distorted and noise or the like affects the signal, giving rise to a problem that an error is generated.

As a measure for countering the problem described above, reduction of the output impedance generated by the function extending card 3 is conceivable. In order to reduce the output impedance of the function extending card 3, however, it is necessary to increase the electrical capacitance of the card control device 6 for controlling the function extending card 3. It is thus necessary to increase the area on the surface of the expensive main board which is occupied by the card control device 6. As a result, the card control device 6 itself also becomes expensive, giving rise to a considerable increase in cost. In addition, with such a measure, the current output through the terminal of the card control device 6 also increases, leading to an increase in current consumption which is a disadvantage for a portable information apparatus because an increase in current consumption will shorten the life of the battery.

OBJECT AND SUMMARY OF THE INVENTION

The present invention addresses the problems described above. It is thus a main object of the present invention to provide a card slot unit which allows a wiring path from a function extending card to a card control device to be shortened substantially.

In order to achieve the object described above, the present invention provides a card slot unit that allows a function extending card having connection electrodes on an insertion-edge side thereof to be inserted for establishing electrical connection with the card slot unit and comprises:

- a slot board on which a predetermined wiring pattern is formed;
- a slot connector which is mounted on the slot board and has connector pins electrically as well as mechanically connectable to the connection electrodes of the function extending card;
- a card control device which is mounted on the slot board and electrically connected to the connector pins of the slot connector through the wiring pattern; and
- an output connector which is mounted on the slot board and electrically connected to the card control device through the wiring pattern.

As described above, the card slot unit has a card control device which is embedded therein to be used in conjunction with the function extending card and electrically connected to the connector pins of the slot connector through the wiring pattern. In this arrangement, signals coming from the function extending card connected to the slot connector are supplied to the card control device by way of the wiring pattern and signals are output from the card control device to the main body of the system by way of the wiring pattern and the output connector. As a result, since the wiring path from the function extending card to the card control device is shortened substantially, the waveform of the signal rarely distorts and is hardly affected by noise.

BRIEF DESCRIPTION OF THE DRAWINGS

The above and other objects, features as well as many of the attendant advantages of the present invention will be more appreciated as the same becomes better understood by reference to the following figures showing preferred embodiments of the present invention wherein.

DETAILED DESCRIPTION OF THE PREFERRED EMBODIMENTS

The present invention will become more apparent from the following detailed description of some preferred embodiments with reference to accompanying diagrams showing the embodiments.

Figure 1:
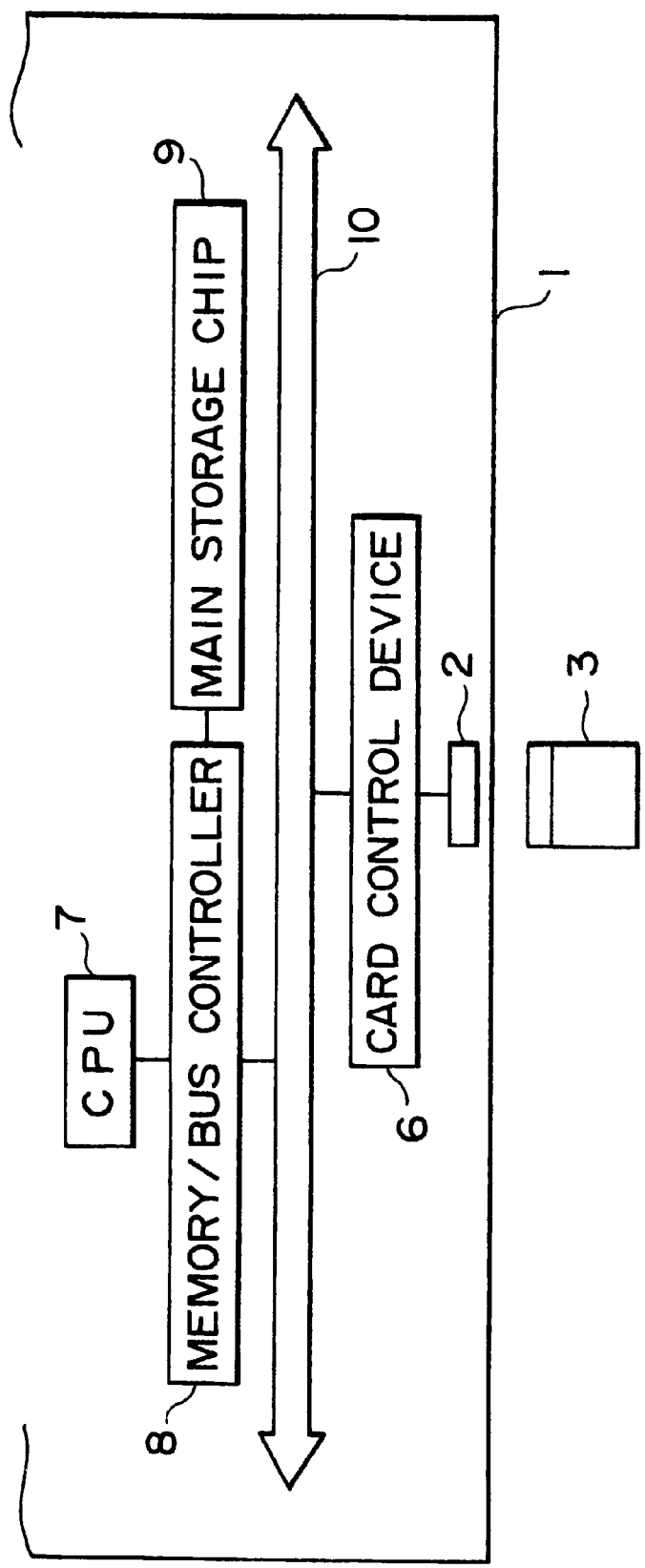
FIG. 1 is a block diagram showing a typical configuration of a PC system of the related art.
Figure 2:
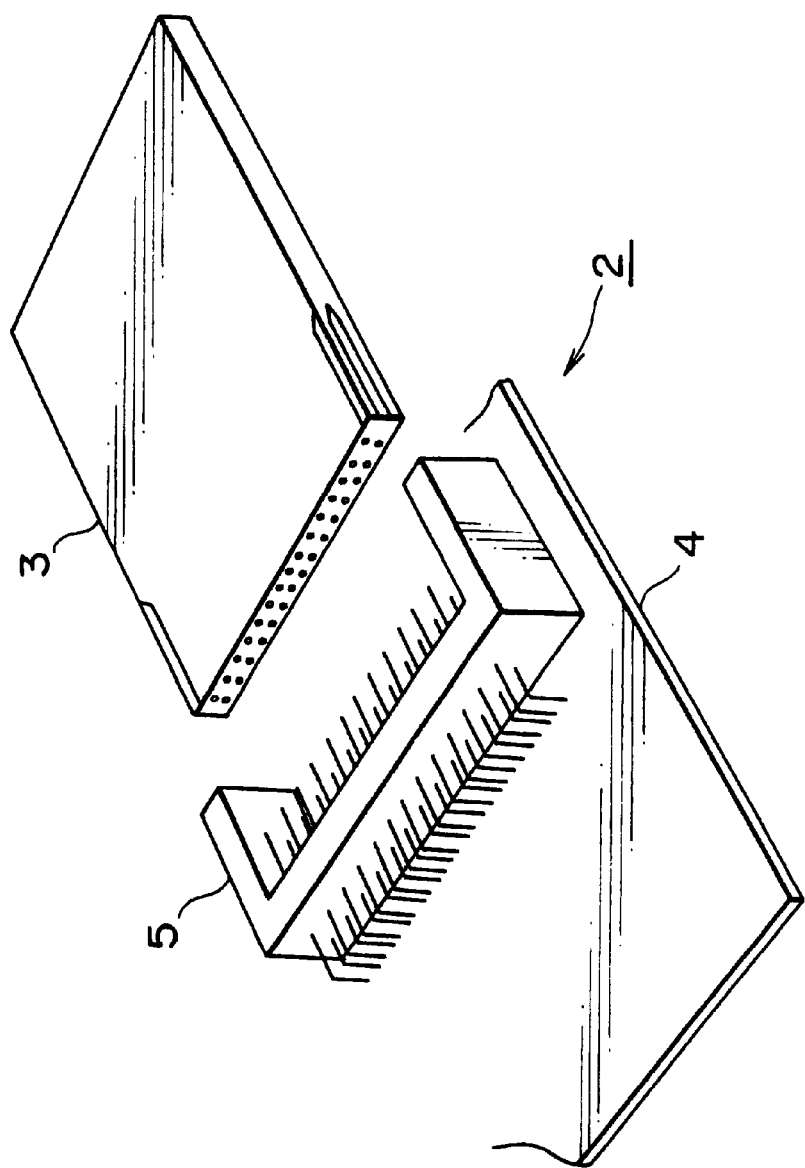
FIG. 2 is a diagram showing a close-up view of connection between a function extending card and a card slot unit shown in FIG. 1.
Figure 3:
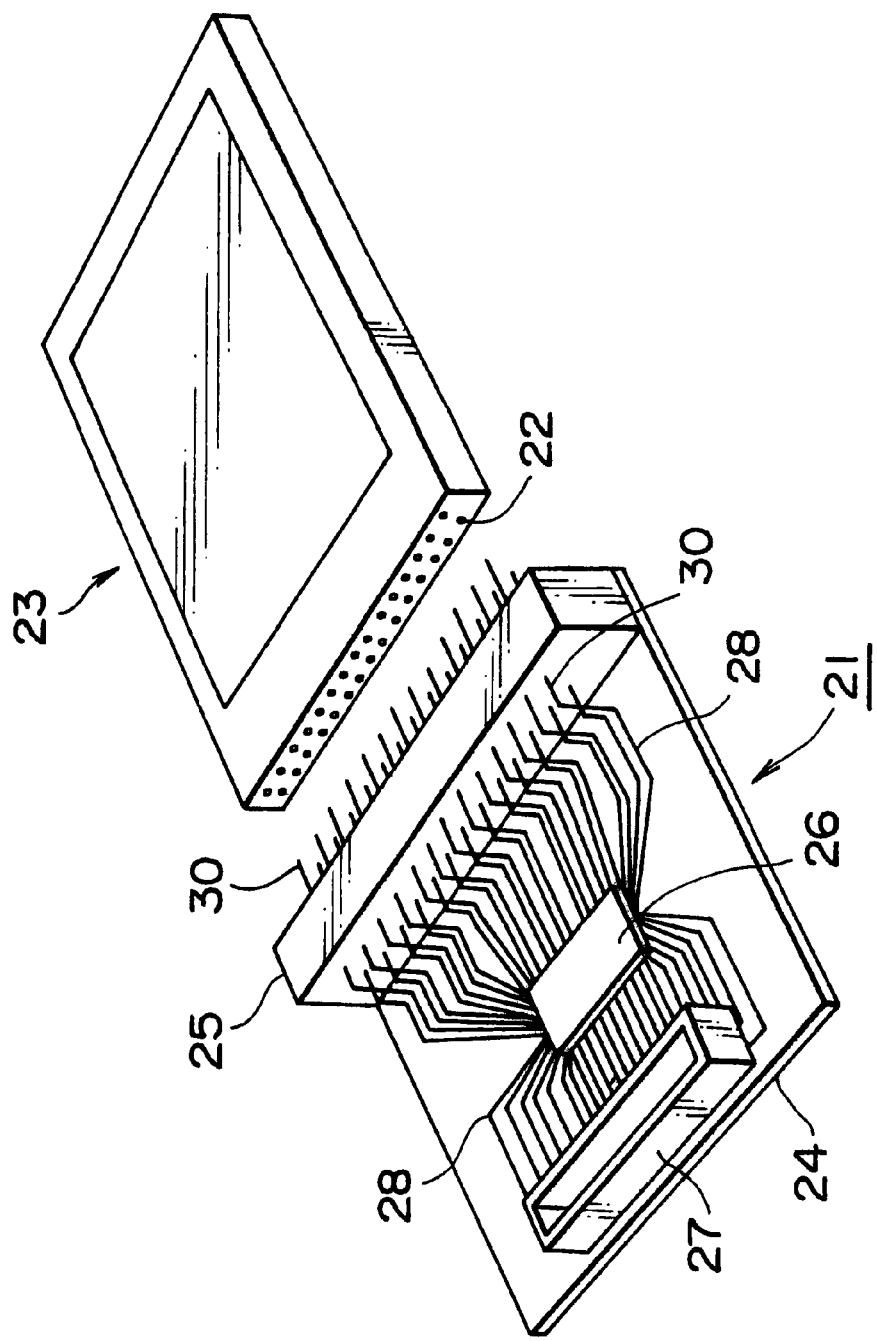
FIG. 3 is a diagram showing a close-up view of a first embodiment implementing a card slot unit provided by the present invention.
Figure 4:
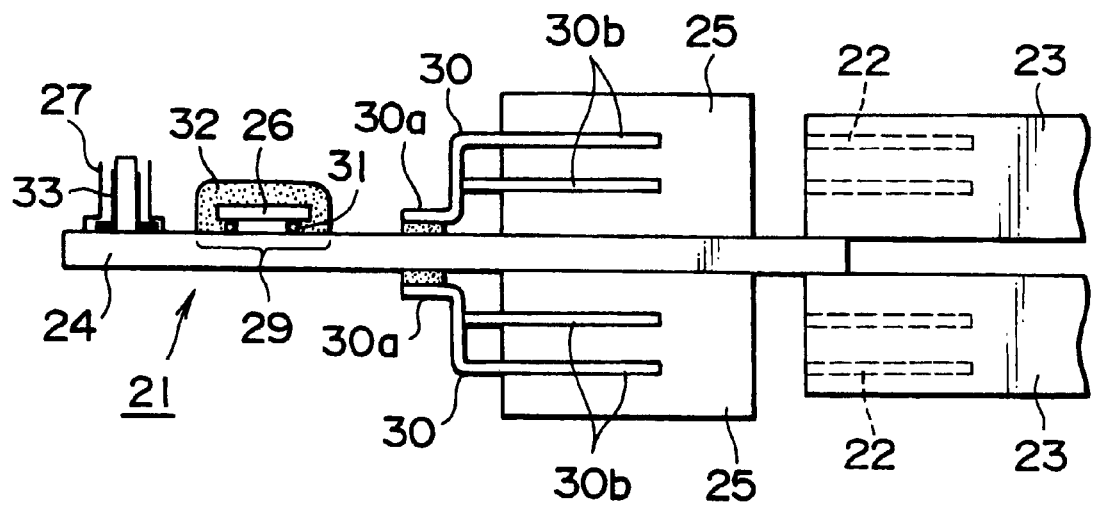
FIG. 4 is a diagram showing a side view of the card slot unit shown in FIG. 3.

FIG. 3 is a diagram showing a close-up view of an embodiment implementing a card slot unit provided by the present invention and FIG. 4 is a diagram showing a side view of the embodiment.

The card slot unit 21 shown in FIGS. 3 and 4 allows a function extending card 23 such as a PC card having connection electrodes 22 on an insertion-edge side thereof to be inserted for establishing electrical connection with the card slot unit 21. The main components of the card slot unit 21 are a slot board 24, a slot connector 25, a card control IC 26 used as a card control device and an output connector 27.

The slot board 24 is a square printed circuit board on which a wiring pattern 28 is formed by using a generally known patterning technique such as the lithography method or the screen printing method. Preserved on the surface of the slot board 24 is a device mounting area 29 for mounting the card control IC 26. The wiring pattern 28 is spread to form a radiating shape with the device mounting area 29 taken as a base point and, at the end of the spreading of the wiring pattern 28, square lands which are not shown in the figure are provided. These lands are arranged on connector mounting areas on both sides of the device mounting area 29 with land pitches matching the pin pitches of the slot and output connectors 25 and 27. It should be noted that the connector mounting areas are also not shown in the figure.

The slot connector 25 has connection pins 30 which are electrically and mechanically connectable to connection electrodes 22 of the function extending card 23. The slot connector 25 is mounted on the connector mounting area on one side of the slot board 24, that is, on the right side in the figure. The shape of each of the connector pins 30 of the slot connector 25 matches the shape of the connection electrode 22 of the function extending card 23 which is a circular hole in the case of the present embodiment. The connector pins 30 are each a pin-shaped conductor having a structure bent to form a crank shape. As many connector pins 30 as the connection electrodes 22 of the function extending card 23 are provided on the slot connector 25 to give a 1:1 relationship between the connector pins 30 and the connection electrodes 22. If the function extending card 23 to be plugged in is a PC card conforming to the PCMCIA standards, for example, the numbers of connection electrodes 22 on the upper and lower rows on the insertion-edge side are each 34 to give a total of 68 in accordance with the specifications of such a card. In this case, 68 connector pins 30 need to be provided on the slot connector 25 to be connected to the connection electrodes 22.

In addition, one end 30a of each of the connector pins 30 of the slot connector 25 shown in FIG. 4 is soldered to a land, that is, an extension tip of the wiring pattern 28, on the slot board 24. The other end 30b of the connection pin 30 also shown in FIG. 4 is parallel to the slot board 24 in the card insertion direction. The other ends 30b of the connector pins 30 are further laid out in two rows matching the layout of the connection electrodes 22 of the function extending card 23.

It should be noted that, in the present embodiment, two slot connectors 25 are provided on both surfaces of the slot board 24 in the so-called two-slot-type configuration so that two function extending cards 23 can be plugged in to the card slot unit 21 at the same time.

The card control IC 26 is mounted on the device mounting area 29 preserved on the surface of the slot board 24 by using the bare-chip method. To put it in more detail, the card control IC 26 is a bare IC chip. It should be noted that bumps 31 provided on chip electrodes of the card control IC can each be a solder or metal bump. The bumps 31 provided on chip electrodes are connected to the wiring pattern 28 on the slot board 24 with the card control IC 26 facing downward by using the so-called FCB (Flip Chip Bonding) technique in order to mount the card control IC 26 on the slot board 24. The card control IC 26 is sealed by chip coat resin 32 typically having epoxy resin as the main component thereof. The chip coat resin 32 protects the card control IC 26 from the external environment such as the temperature and the humidity as well as maintains the electrical insulation of the card control IC 26 from the external world. Since the bumps 31 provided on the chip electrodes are connected to the wiring pattern 28 in such a mounting state as described above, the card control IC 26 is electrically connected to the connector pins 30 of the slot connector 25 through the wiring pattern 28.

The output connector 27 serves as a contact means for connecting signal lines on the main board not shown in the figure to signal lines on the slot board 24. The output connector 27 is mounted on a connector mounting area on the other side of the slot board 24, that is, the left side in the figure. A plurality of connector pins 33 are provided inside the output connector 27 in two rows in the longitudinal direction. Each of the connector pins 33 is made of a thin metallic plate having a bent structure approximately resembling the letter. The connector pins 33 are laid out so that the L-shaped connector pins 33 on one of the rows is in an orientation opposite to that on the other row in the so-called back-to-back arrangement. The lower end of each of the connector pins 33 is soldered to a land on the slot board 24, that is, an extension tip of the wiring pattern 28. In this way, the output connector 27 is connected electrically to the card control IC 26 through the wiring pattern 28.

The structure of the output connector 27 of the slot board 24 such as the shape, the dimensions and the pin pitch thereof must conform to the structure of the connector on the main board to which the card slot unit is to be provided. Thus, the structure of the output connector 27 is not limited to specifications of the connector of a specific main board.

By the same token, the structure of the slot connector 25 of the slot board 24 such as the shape, the dimensions and the pin pitch thereof must conform to the specifications of the function extending card 23 to be plugged into the card slot unit 21. Thus, the structure of the slot connector 25 is not limited to the specifications of the connector electrodes 22 of a specific function extending card 23. For example, if the connector electrodes 22 on the insertion-edge side of a function extending card 23 are laid out on a flat plane in accordance with certain card specifications, the slot connector 25 on the card slot unit 21 must have a structure conforming to the specifications wherein connector pins 30 having a proper spring characteristic are provided on the slot connector 25 to be brought into contact with the connector electrodes 22 on the function extending card 23 by using the spring characteristic.

In the card slot unit 21 with the configuration described above, the card control IC 26 is embedded therein so that the wiring path from the function extending card 23 plugged to the slot connector 25 to the card control IC 26 is extremely short in comparison with the wiring path in the card slot unit of the related art. In addition, the inductance L and capacitance C of the wires on the wiring path are also decreased proportionally to the reduction of the wiring path. As a result, the waveform of the signal does not distort easily, providing endurance against a relatively high impedance. In addition, since the wiring path is shortened, the effect of noise is reduced accordingly, allowing the number of errors generated in the signal to be decreased.

In the case of the card slot unit of the related art, the card control device such as the card control IC 26 is mounted on the main board of a PC or another information apparatus. As a result, there has been encountered a problem that the number of connector pins connecting the main board to the slot boards 24 increases. This is because the number of slot boards 24 is increased to handle a plurality of function extending cards even if the function extending cards can be controlled by using a single card control device. By adopting the configuration wherein the card control device such as the card control IC 26 is embedded on the card slot unit 21 as described above, however, the number of connector pins connecting the main board to the slot board 24 can also be reduced by half as well.

Next, a second embodiment implementing the card slot unit provided by the present invention is explained.

In the first embodiment, the slot connector 25, the card control IC 26 and the output connector 27 are mounted on one of the surfaces, that is, the upper surface in the figure, of the slot board 24. It should be noted, however, that while the present invention has been described with reference to the first illustrative embodiment, the description is not intended to be construed in a limiting sense. It is to be understood that the subject matter encompassed by the present invention is not limited to the first embodiment. That is to say, another embodiment different from the present embodiment can also be used. For example, the slot connector 25 and the output connector 27 are mounted on one of the surfaces, that is, the upper surface in the figure, of the slot board 24 while the card control IC 26 is mounted on the other surface on the opposite side of the upper surface, that is, the lower surface in the figure, of the slot board 24 as shown in FIG. 3. In this second embodiment, a multi-layer wiring structure using plated though-holes is adopted as a structure of the slot board 24 and the slot connector 25 is electrically connected to the card control IC 26 while the card control IC 26 is electrically connected to the output connector 27 by different wiring patterns which are not shown in the figure.

Figure 5:
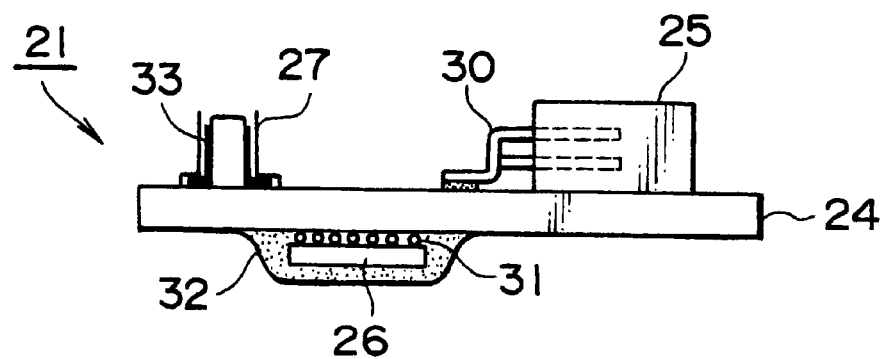
FIG. 5 is a diagram showing a side view of a second embodiment implementing a card slot unit.

In the case of the second embodiment shown in FIG. 5, since the slot connector 25, the card control IC 26 and the output connector 27 are mounted on the slot board 24 at a high mounting density, the size of the card slot unit 21 as a whole can be reduced.

In addition, by mounting the slot connector 25 as a stack at two upper and lower stages, a two-slot type can be implemented without requiring to increase the size of the card slot unit 21.

In addition, by adopting the flip chip bonding technology as described above as an embodiment for mounting the card control IC 26 on the slot board 24, the area on the surface of the slot board 24 occupied by the control IC 26 can be reduced to a minimum. As described above, however, while the present invention has been described with reference to this first illustrative embodiment, the description is not intended to be construed in a limiting sense. It is to be understood that the subject matter encompassed by the present invention is not limited to the present embodiment. That is to say, another embodiment different from the present embodiment can also be used. For example, the bare chip mounting technology adopting the wire bonding technique and the TAB (Tape Automatic Bonding) technology of the bare chip methods other than the flip chip bonding technology can be embraced to result in equivalent space saving. As for the packaging technology for the card control IC 26, a CSP (Chip Size Package or Chip Scale Package) structure which draws much attention in recent years can also be adopted in order to achieve equivalent space saving.

Figure 6:
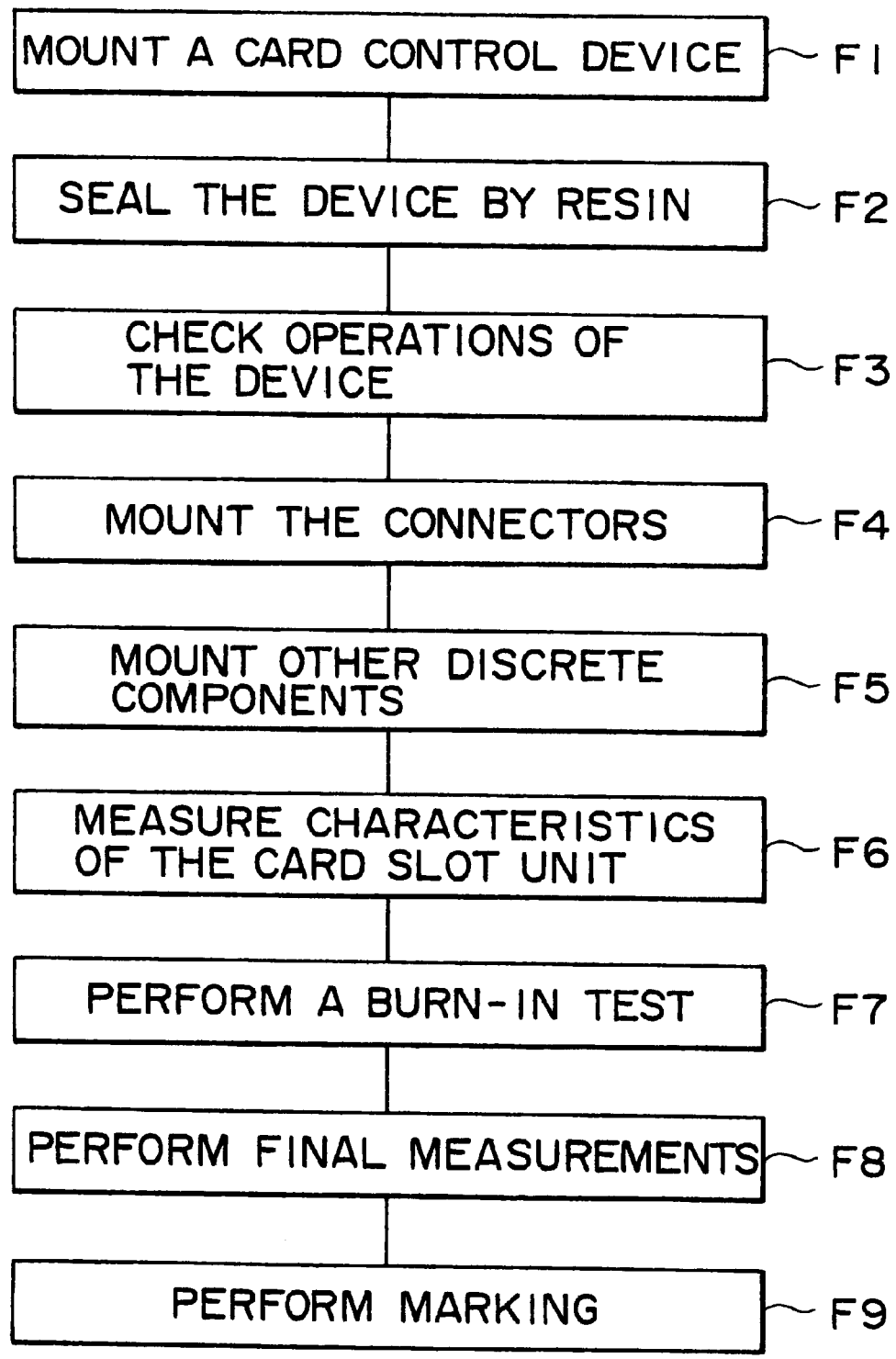
FIG. 6 is a diagram showing a third embodiment implementing a sequence of process flows used for explaining a method of manufacturing a card slot unit.

Next, a method of manufacturing the card slot unit 21 as implemented by a third embodiment is explained by referring to FIG. 6. It should be noted that, normally, a plurality of card slot units 21 are assembled concurrently at the same time. In order to make the explanation easy to understand, however, a procedure for assembling only one card slot unit 21 is described.

First of all, the assembly work sequence starts with a process flow F1 in which a slot board 24 serving as a base on which a wiring pattern has been created is prepared. On the other hand, a card control IC 26 to be used as a card control device having a bare-chip structure is prepared by creating stud bumps on the chip electrodes thereof using the ball bonding technology. Then, the card control IC 26 is mounted on the slot board 24 by adjusting the position of the card control IC 26 in such a way that the chip electrodes coincide with the respective wires on the wiring pattern on the slot board 24. Then, the slot board 24 is passed through a nitrogen-atmosphere furnace in order to melt the bumps. In this way, the card control IC 26 and the slot board 24 are electrically and mechanically joined to each other.

Subsequently, the assembly work sequence goes on to a process flow F2 in which chip coat resin, a mixture of typically epoxy resin and a filler such as silica or carbon calcium, is poured as drops to the device mounting area on the slot board 24 by using equipment such as a dispenser before being cured by means of an oven or the like. In this way, the bare card control IC 26 is sealed by the chip coat resin.

Figure 7:
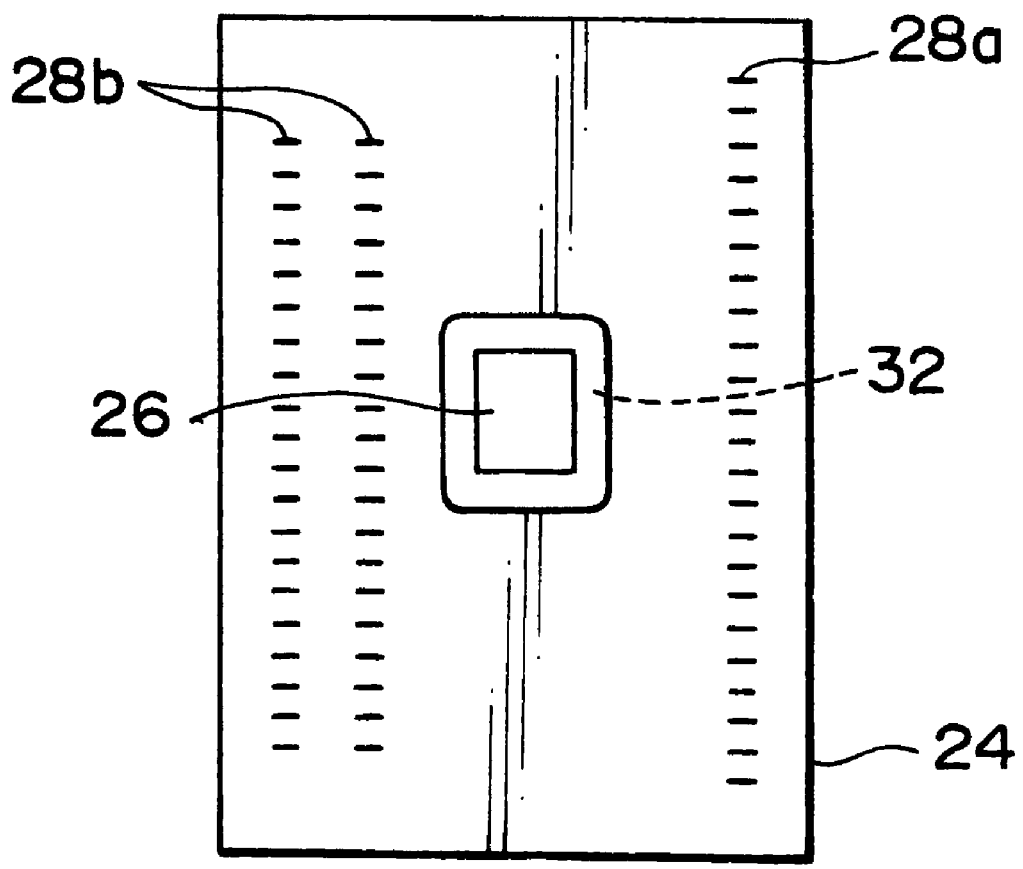
FIG. 7 is a diagram used for explaining the state of the card slot unit in the course of manufacturing shown in FIG. 6.

At the end of the process flow F2, only the card control IC 26 is mounted on the slot board 24, being sealed by the chip coat resin 32 as shown in FIG. 7.

Next, the assembly work sequence proceeds to a process flow F3 in which the operation of the card control IC 26 is checked through the wiring pattern 28 created on the slot board 24. At this point of time, since no components except the card control IC 26 itself are mounted on the slot board 24, a probe is typically brought into contact with connection lands 28a and 28b for the slot connector 25 and the output connector 27 as shown in FIG. 5. A signal is then transmitted by a test circuit for checking the operation of the card control IC 26 by way of the probe. In this way, an open or short circuit between the slot board 24 and the card control IC 26 and the operation of the card control IC 26 can be checked.

Only if results of the examination to check the open or short circuit between the slot board 24 and the card control IC 26 and the operation of the card control IC 26 indicate a good product, that is, only if the card control IC 26 operates in a prescribed way in response to a signal transmitted by the test circuit by way of the probe, does the assembly work sequence continue to a process flow F4 in which the slot connector 25 and the output connector 27 are mounted on the slot board 24. The pins 30 and 33 of the slot and output connectors 25 and 27 are then fixed to the connection lands 28a and 28b by solder. The assembly work sequence then goes on to a process flow F5 in which other discrete components such as a chip capacitor required for supplying a stable voltage to the card control IC 26 are mounted.

At the end of the process flow F5, the mounting of all components on the slot board 24 is completed.

The assembly work sequence then proceeds to a process flow F6 in which a function extending card 23 is plugged into the slot connector 25 and the card slot unit 21 is operated under the same condition as the actual application. The characteristics of the card slot unit 21 are then measured. Subsequently, the assembly work sequence goes on to a process flow F7 to carry out the so-called burn-in test in which the card slot unit 21 is operated in a real mode under the same condition as the actual application except that the ambient temperature is raised to about 85 degrees Celsius for 2 to 4 hours. Then, the assembly work sequence continues to a process flow F8 in which a final measurement of the characteristics of the. card slot unit 21 is carried out with the ambient temperature lowered to a room-temperature level of 25 degrees Celsius. Finally, the assembly work sequence goes on to a process flow F9 in which marking is carried out to put a product name, a manufacturing lot number and other pieces of information at prescribed locations on the card slot unit 21. At this point of time, the sequence of assembly processes are completed.

In the method of manufacturing the card slot unit 21 described above, at the stage of mounting the card control IC 26 on the slot board 24, the operation of the card control IC 26 is checked through the wiring pattern 28 on the slot board 24. Only if the product is determined to be good are the slot connector 25 and the output connector 27 mounted on the slot board 24. If the mounted card control IC 26 is found defective or if the contact between the card control IC and the slot board 24 is found bad, on the other hand, the assembly work sequence is discontinued to prevent the assembly processes following the mounting of the card control IC 26 and the other components from being wasted. If the defective card control IC 26 is to be replaced by a good one, the replacement work or the repair work can be carried out relatively with ease since the slot and output connectors 25 and 27 have not been mounted yet on the slot board 24.

Figure 8:
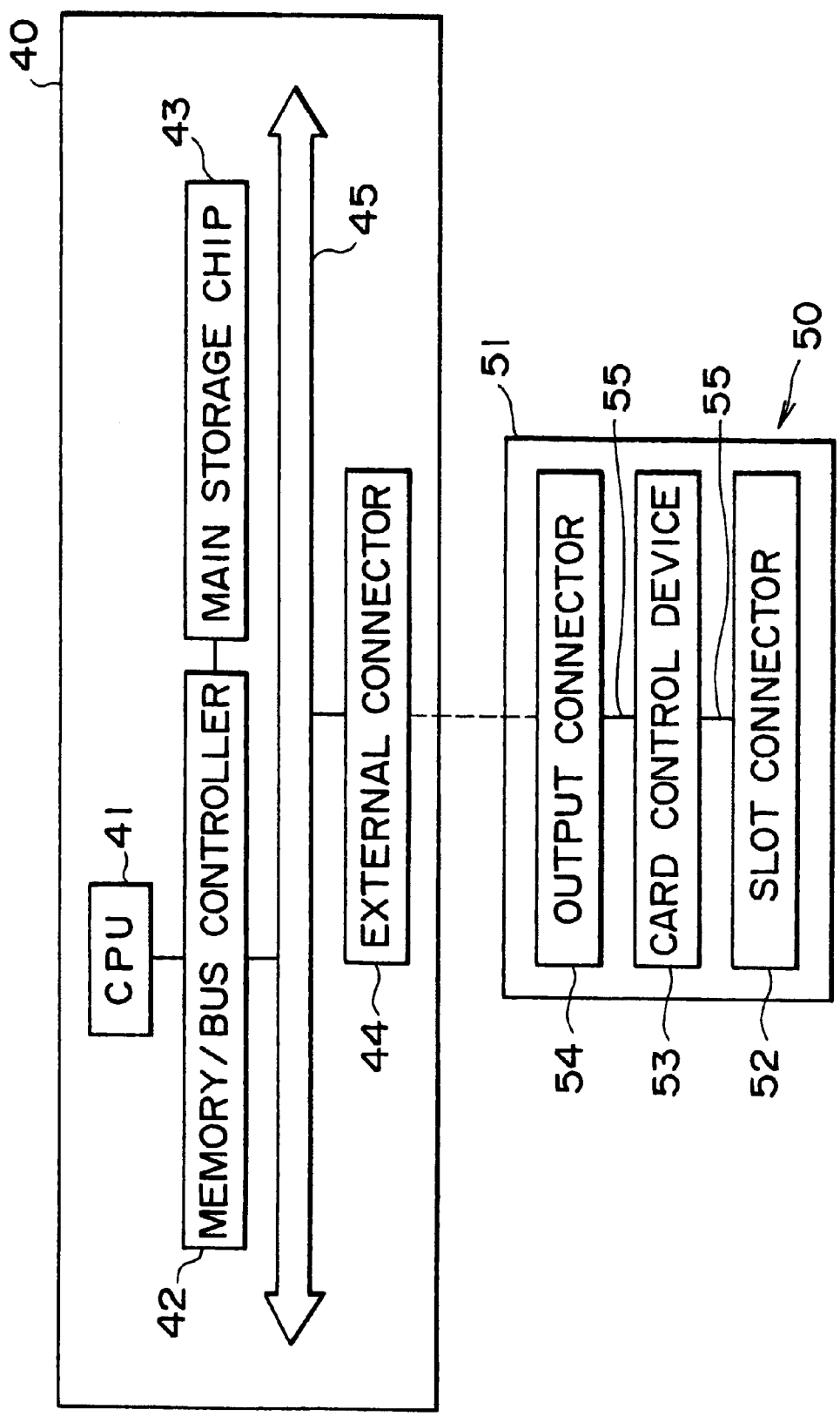
FIG. 8 is a block diagram showing a fourth embodiment implementing a computer apparatus provided by the present invention.

FIG. 8 is a block diagram showing a fourth embodiment implementing a computer apparatus provided by the present embodiment. To be more specific, the diagram shows an internal configuration of the main body of the computer apparatus.

As shown in the figure, a CPU chip (a microprocessor) 41, a memory/bus controller 42 and a main-storage chip (a DRAM chip) 43 are mounted on the main board 40. To interface with a card slot unit, an external connector 44 is provided. A system bus 45 is provided to connect the external connector 44 to the memory/bus controller 42.

On the other hand, a card slot unit 50 into which a function extending card such as a PC card is plugged comprises a slot board 51 serving as a base, a slot connector 52, a card control device 53 and an output connector 54. The slot connector 52, the card control device 53 and the output connector 54 are mounted on the slot board 51.

A predetermined wiring pattern 55 is created on the slot board 51 by using a generally known patterning technology such as the lithography technique. The slot connector 52 has connector pins which can be connected electrically as well as mechanically to connection electrodes provided on the insertion edge of the function extending card. It should be noted that the connector pins themselves are not shown in the figure. The slot connector 52 is mounted on the slot board 51 with ends on one side of the connector pins connected to the wiring pattern 55 on the slot board 51.

On the other hand, the card control device 53 is an integrated-circuit chip which is mounted on the slot board 51 with chip electrodes thereof connected to the wiring pattern 55 on the slot board 51. In this way, the chip electrodes are electrically connected to the connector pins of the slot connector 52 through the wiring pattern 55. In addition, the output connector 54 is electrically and mechanically connected to the external connector 44 on the main board 40 of the PC apparatus. The output connector 54 is also electrically connected to the card control device 53 through the wiring pattern 55 created on the slot board 51.

In the computer apparatus with the configuration described above, since the card control device 53 is embedded in the card slot unit 50, the wiring path from the function extending card plugged to the slot connector 52 to the card control device 53 is extremely short in comparison with the wiring path in the conventional card slot unit. In addition, the inductance L and capacitance C of the wires on the wiring path are also decreased proportionally to the reduction of the wiring path. As a result, the waveform of the signal does not distort easily, providing endurance against a relatively high impedance. In addition, since the wiring path is shortened, the effect of noise is reduced accordingly, allowing the number of errors generated in the signal to be decreased. On the top of that, it is thus no longer necessary to mount the card control device 53 on the expensive main board 40 and it is also no longer necessary to increase the electrical capacitance of the card control device 53 for controlling the function extending card in order to reduce the output impedance of the function extending card. As a result, the cost of the computer apparatus can be reduced. In addition, since the card control device 53 is mounted on the card slot unit 50, the number of connector pins to be brought into contact with the main board 40, strictly speaking, to the external connector 44 shown in the figure, can be reduced by half.

In addition, by applying such an apparatus configuration to the so-called portable PC such as a notebook PC or a sub-notebook PC, the operating frequency can be raised to a value in the high-frequency range, preventing the life of the battery from being shortened.

As described above, however, while the present invention has been described with reference to a computer apparatus, the description is not intended to be construed in a limiting sense. It is to be understood that the subject matter encompassed by the present invention is not limited to the computer apparatus including a portable or desktop PC. That is to say, the present invention can be applied to an apparatus to which a new function can be added by using a function extending card. For example, the present invention can also be applied to a variety of computer apparatuses such as a word processor and a telephone set.

As described above, in the card slot unit provided by the present invention, the slot connector, the output connector and the card control device are mounted on the slot board serving as a base in a configuration in which the card control device is embedded so that the wiring path from the function extending card plugged to the slot connector to the card control device is extremely short in comparison with the wiring path in the conventional card slot unit. In addition, the inductance L and capacitance C of the signal lines on the wiring path are also decreased proportionally to the reduction of the wiring path. Thus, the waveform of the signal hardly gets out of shape, enhancing the endurance against a high impedance. In addition, since the wiring path is shortened, the effect of noise is reduced accordingly, allowing the number of errors generated in the signal to be decreased. As a result, a signal with a high frequency such as a moving-picture signal can be handled well.

What is claimed is:

1. A card slot unit that accommodates a function extending card having connection electrodes on an insertion-edge side thereof in a slot portion to establish electrical connection between the function extending card and the card slot unit, the card slot unit comprising:

a slot board located behind the slot portion and having a wiring pattern disposed thereon;

a card control device mounted on said slot board and electrically coupled with the wiring pattern.

2. A card slot unit according to claim 1 wherein said card control device is mounted on a first surface of said slot board opposite a second surface of said slot board on which a slot connector for the function extending card is mounted.

3. A card slot unit according to claim 1 wherein said card control device is an IC mounted on said slot board by using a bare-chip bonding method.

4. A card slot unit that accommodates a function extending card having connection electrodes on an insertion-edge side thereof in a slot portion to establish electrical connection between the function extending card and the card slot unit, the card slot unit comprising:

a slot board located behind the slot portion and having a wiring pattern disposed thereon;

a slot connector mounted on said slot board and having connector pins connectable to the connection electrodes of the function extending card;

a card control device mounted on said slot board and electrically coupled to said connector pins of said slot connector through the wiring pattern on said slot board; and an output connector mounted on said slot board and electrically coupled to said card control device through said wiring pattern on said slot board.

5. A card slot unit according to claim 4 wherein said slot connector and said output connector are mounted on one of the surfaces of said slot board while said card control device is mounted on the other surface of said slot board.

6. A computer apparatus with a card slot unit that accommodates a function extending card for extending functions of said computer apparatus, wherein the function extending card is inserted into a slot portion of the card slot unit and has connection electrodes on an insertion-edge side thereof, the card slot unit in the computer apparatus comprising:

a slot board located behind the slot portion and having a wiring pattern disposed thereon;

a slot connector mounted on said slot board and having connector pins connectable to the connection electrodes of the function extending card;

a card control device mounted on said slot board and electrically coupled to said connector pins of said slot connector through the wiring pattern on said slot board; and an output connector mounted on said slot board and electrically coupled to said card control device through said wiring pattern on said slot board.

7. A computer apparatus according to claim 6 wherein said computer apparatus is a portable personal computer.

8. A computer apparatus according to claim 6 wherein said card control device is an IC mounted on said slot board by using a bare-chip bonding method.

9. A computer apparatus according to claim 6 wherein said card control device is mounted on the surface of said slot board opposite to the surface of said slot board on which said slot connector is mounted.

10. A portable computer apparatus comprising:

a main board for mounting a memory/bus controller, a storage device, a microprocessor, a bus control device and an external connector for transferring data;

a card slot unit having a slot board, a slot connector, a card control device and an output connector; and a function extending card to be plugged into a slot portion of said card control unit, wherein the slot board in said card slot unit is located behind the slot portion and has a wiring pattern disposed thereon.

11. A portable computer apparatus according to claim 10 wherein said card control device is mounted on a first surface of said slot board opposite a second surface of said slot board on which the slot connector is mounted.

12. A portable computer apparatus according to claim 10 wherein said card control device is a chip mounted on said slot board by using a bare-chip bonding method.

* * * * *